United States Patent
Weindorf et al.

(10) Patent No.: US 10,399,020 B2
(45) Date of Patent: *Sep. 3, 2019

(54) FILTER ELEMENT AND FILTER SYSTEM WITH SIPHON VENTING ARRANGEMENT

(71) Applicant: MANN+HUMMEL GMBH, Ludwigsburg (DE)

(72) Inventors: Martin Weindorf, Kornwestheim (DE); Idriss Razgani, Ludwigsburg (DE); Pius Trautmann, Stuttgart (DE); Bernd Nageldinger, Asperg (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 169 days.

This patent is subject to a terminal disclaimer.

(21) Appl. No.: 15/409,209

(22) Filed: Jan. 18, 2017

(65) Prior Publication Data

US 2017/0203243 A1 Jul. 20, 2017

(30) Foreign Application Priority Data

Jan. 18, 2016 (DE) .................. 10 2016 000 340

(51) Int. Cl.
*B01D 27/00* (2006.01)
*B01D 36/00* (2006.01)
*B01D 29/11* (2006.01)
*B01D 35/00* (2006.01)
*B01D 35/30* (2006.01)
(Continued)

(52) U.S. Cl.
CPC ............ *B01D 36/001* (2013.01); *B01D 29/11* (2013.01); *B01D 29/21* (2013.01); *B01D 35/005* (2013.01); *B01D 35/30* (2013.01); *B01D 36/003* (2013.01); *B01D 2201/295* (2013.01); *B01D 2201/347* (2013.01); *B01D 2201/4046* (2013.01)

(58) Field of Classification Search
None
See application file for complete search history.

(56) References Cited

U.S. PATENT DOCUMENTS

| 7,299,931 | B2 | 11/2007 | Schachtrup | |
|---|---|---|---|---|
| 2004/0099587 | A1* | 5/2004 | Schachtrup | .......... B01D 36/001 210/115 |

FOREIGN PATENT DOCUMENTS

| DE | 102012012542 A1 | 1/2014 |
|---|---|---|
| DE | 102013020539 A1 | 6/2015 |
| DE | 102013226810 A1 | 6/2015 |

OTHER PUBLICATIONS

DE102012012542 Kusebauch et al.—Fuel Filtter Used in Motor Car (MT & Abstract; Jan. 2, 2014; 18 pages).*

* cited by examiner

*Primary Examiner* — Hayden Brewster
(74) *Attorney, Agent, or Firm* — James Hasselbeck (57) ABSTRACT

A filter element (10) for a liquid medium such as fuel, having a filter medium (16) which is arranged in an annular manner and a venting arrangement (30), having
a first vent channel (60), connected at the intake end to the pre-filtration side (26) of the filter element (10), a vent tube (32) which extends away from the upper end plate (12) and which has at one end an inlet opening (34) and at the other end an outlet opening (36) for fluidic connection of the vent tube (32) to a vent stub of a filter housing, or a vent tube portion for connection to a vent tube of a filter housing, which portion extends away from the upper end plate (12) axially in the direction of the lower end plate (14) and has an inlet opening (34) at one end.

15 Claims, 6 Drawing Sheets

(51) Int. Cl.
*B01D 29/21* (2006.01)
*B01D 35/28* (2006.01)

FILTER ELEMENT AND FILTER SYSTEM WITH SIPHON VENTING ARRANGEMENT

TECHNICAL FIELD

The invention relates to a filter element for a liquid medium, in particular fuel, having a filter medium which is arranged in an annular manner relative to the longitudinal axis of the filter element, also having an end plate, which is the upper end plate when the filter element is in operation, and a lower end plate, between which the filter medium is retained, wherein a pre-filtration side arranged fluidically upstream of the filter medium and a post-filtration side of the filter element arranged fluidically downstream of the filter medium are demarcated from one another by the filter medium. The filter element has a venting arrangement comprising a first vent channel which is fluidically connected at the intake end to the pre-filtration side of the filter element and also comprising a vent tube which extends axially away from the upper end plate in the direction of the lower end plate and which has an inlet opening at one end and an outlet opening at the other end for fluidic connection of the vent tube to a vent stub of a filter housing.

BACKGROUND

A filter element of the aforementioned type is known for example from DE 10 2012 012 542 A1. In the known filter element, when the filter operation is interrupted, i.e. in the event of a lack of throughflow of the filter element by the liquid medium to be filtered, by means of the vent tube an undesirable retrograde ingress of air onto the pre-filtration side of the filter element can occur. As a result, when the filter operation is resumed a delayed pressure buildup of the liquid medium can occur. This may be disadvantageous in particular in motor vehicles with an internal combustion engine in the so-called start-stop automatic operation.

SUMMARY

The object of the invention is to provide a filter element and a filter system having such a filter element, wherein during operation a fast pressure buildup of the liquid medium is made possible.

In the filter element according to the invention the siphon which is interposed fluidically between the vent tube and the first vent channel can reliably counteract an undesirable backflow of air from the vent tube via the first vent channel onto the pre-filtration side of the filter element. Overall as a result a compressible volume of air arranged on the pre-filtration side can be reduced and when the filter operation is (re-)commenced a desired operating pressure of the liquid medium can be built up more quickly. This is advantageous in particular in the event of frequent interruptions of the filter operation, as is the case for example with motor vehicles in automatic start-stop operation. A siphon is characterized by a substantially U-shaped form or a U-shaped flow cross-section. During a first operational use of the filter element the liquid medium together with the air from the pre-filtration side enters the siphon by means of the first vent channel. After the first operational use of the filter element a defined volume or a liquid level of the liquid medium remains in the siphon, so that a backflow of air (or other gases) from the vent tube can be blocked. On the other hand, in the filter operation air subjected to the operating pressure of the liquid medium on the pre-filtration side can flow through the siphon and through the liquid medium trapped therein to the vent tube. As a result the siphon functionally forms a one-way valve for the air to be drawn off on the pre-filtration air side.

According to the invention the siphon is delimited at least in part by the vent tube itself. Therefore, in this case the vent tube has a dual function. On the one hand, it enables the venting of the filter element and, on the other hand, it serves simultaneously as a component defining the siphon. In this way the number of components necessary for the siphon can be kept low. Furthermore, additional sealing measures can be omitted or reduced.

The vent tube is preferably made in one piece and fastened to the element. Alternatively, the vent tube can be made in multiple parts, wherein the components are distributed over the filter element and the housing which accommodates the filter element. In this case the filter element has a vent tube portion which can be connected in particular in a fluid-tight manner to the vent tube on the filter housing. The siphon is then preferably delimited at least in part by the vent tube portion on the filter element. The following statements with respect to the vent tube apply in the same way to both variants. The end portion of the vent tube fastened to the element which is associated with the siphon corresponds to the vent tube portion on the filter element in the case where the vent tube is fixed to the housing and is configured at least substantially identically.

According to the invention the siphon can be delimited, in particular, in the radial direction internally by an end portion of the vent tube and in the radial direction externally by a tube stub which is formed on the vent tube. The reduction in necessary components achieved in this way offers cost advantages overall in the manufacture of the filter element. In the aforementioned case the siphon can be delimited in a structurally simple manner in the axial direction by a connecting portion, by means of which the tube stub is formed on the vent tube.

The vent tube is particularly preferably fastened to the filter element. In other words, the vent tube is an integral component of the filter element and is installed or replaced as a structural unit in a filter housing with this element.

From the manufacturing technology point of view, the vent tube is advantageously retained on the inlet opening side in a recess in the upper end plate, preferably in a radial press fit. In this case the recess can be delimited in particular in the radial direction externally by an outer wall member and in the radial direction internally by an inner wall member of the upper end plate. In this case the two wall members extend in the direction of the longitudinal axis of the filter element and are formed in one piece with the upper end plate. The vent tube can be supported or fastened to one or more further components of the filter element, for example a support pipe in the form of a grid for the filter medium or a final separator screen for water contained in the liquid medium.

According to a further embodiment of the invention, the vent tube can be retained by its tube stub in the aforementioned recess in the upper end plate, preferably in a press fit.

The siphon is preferably fluidically connected by means of an axially extending riser channel to the inlet opening of the vent tube. According to the invention the riser channel can be formed between the vent tube and an insert part of the upper end plate.

According to the invention the first vent channel can be delimited in the radial direction at least partially by the inner wall member of the upper end plate and also by an aforesaid insert part of the upper end plate. In this case the first vent channel can comprise in particular a groove, which is open in the radial direction, in the inner wall member or the insert part of the upper end plate. As a result, the first vent channel can be produced in a simple and cost-effective manner by an injection molding process used for production of the end plate or of the insert part with a suitable (small) flow cross-section suitable for ventilation purposes. The flow channel is preferably configured at least in part as a so-called capillary channel, in order to ensure a capillarity with respect to the liquid medium, i.e. a capillary effect. In this way even an undesirable (buoyancy-related) passage of air from the siphon through the first vent channel can be reliably counteracted. As a result, also, outside of a filter operation, a permanent liquid column of the liquid medium can be ensured inside the vent channel.

According to a preferred embodiment of the invention, the insert part can extend through a preferably central opening in the upper end plate in the axial direction into the filter element. In this case the opening in the upper end plate can be delimited by the inner wall member of the upper end plate in the radial direction.

According to an alternative embodiment of the invention, the insert part is configured as a double sleeve which is H-shaped in longitudinal section and extends in the axial direction into the recess in the upper end plate. Such a double sleeve has a base portion with two sleeve portions which extend away from the base portion in opposing directions. Thus the sleeve is closed by the base portion, i.e. it has no axial passage. The double sleeve preferably extends into the siphon, i.e. the double sleeve is arranged in part in the radial direction between the end portion of the vent tube and the aforesaid tube stub of the vent tube.

According to the invention the venting arrangement can comprise a second vent channel which is fluidically connected at the intake end to the post-filtration side of the filter element. In this way the post-filtration side of the filter element can also be vented in the filter operation by means of the vent tube. Overall as a result the build-up of an operating pressure of the liquid medium on the post-filtration side can be further improved. In this case in the structurally simplest case the second vent channel can be delimited in the radial direction at least in part by the outer wall member of the upper end plate and the vent tube.

From the manufacturing viewpoint the second vent channel advantageously comprises a groove, which is open in the radial direction, in the outer wall member of the upper end plate or of the vent tube. According to the invention the second vent channel can open into the siphon in a corresponding manner to the first vent channel. In this case it is also possible to effectively counteract an undesirable backflow of air from the vent tube by means of the second vent channel to the post-filtration side of the filter element. Furthermore, the second vent channel can be configured in the manner described above as a capillary channel.

The aforementioned groove of the first or of the second vent channel can be configured in each case as an axially extending linear groove. According to a particularly preferred embodiment of the invention the groove can also be configured as a spiral groove which extends helically around the longitudinal axis of the filter element. Thus in this case the groove extends continuously helically relative to the longitudinal axis of the filter element. As a result, a required flow resistance can be set for the air to be drained or for the liquid medium in a manner which is even simpler in terms of manufacturing technology.

For sealing reasons, in a manner which is known per se the filter medium can be glued to the two end plates or can be embedded in the material of the two end plates.

The filter system according to the invention has a filter element according to the invention and a filter housing to accommodate the filter element. In one embodiment the filter element has a vent tube which extends as far as a socket on the filter housing and can be connected thereto in a fluid-tight manner. In an alternative embodiment the filter housing has a vent tube, which extends in the axial direction into an accommodating space for the filter element and can be connected to a vent tube portion of the filter element in a fluid-tight manner. For example, on the filter element the vent tube portion surrounds the vent tube which is fixed to the housing. For sealing, the vent tube fixed to the housing has a sealing element which is arranged on an outer circumference in order to produce a radial seal.

BRIEF DESCRIPTION OF THE DRAWINGS

The invention is described in greater detail below with reference to two embodiments illustrated in the drawings. In the drawings.

DETAILED DESCRIPTION

Figure 1:
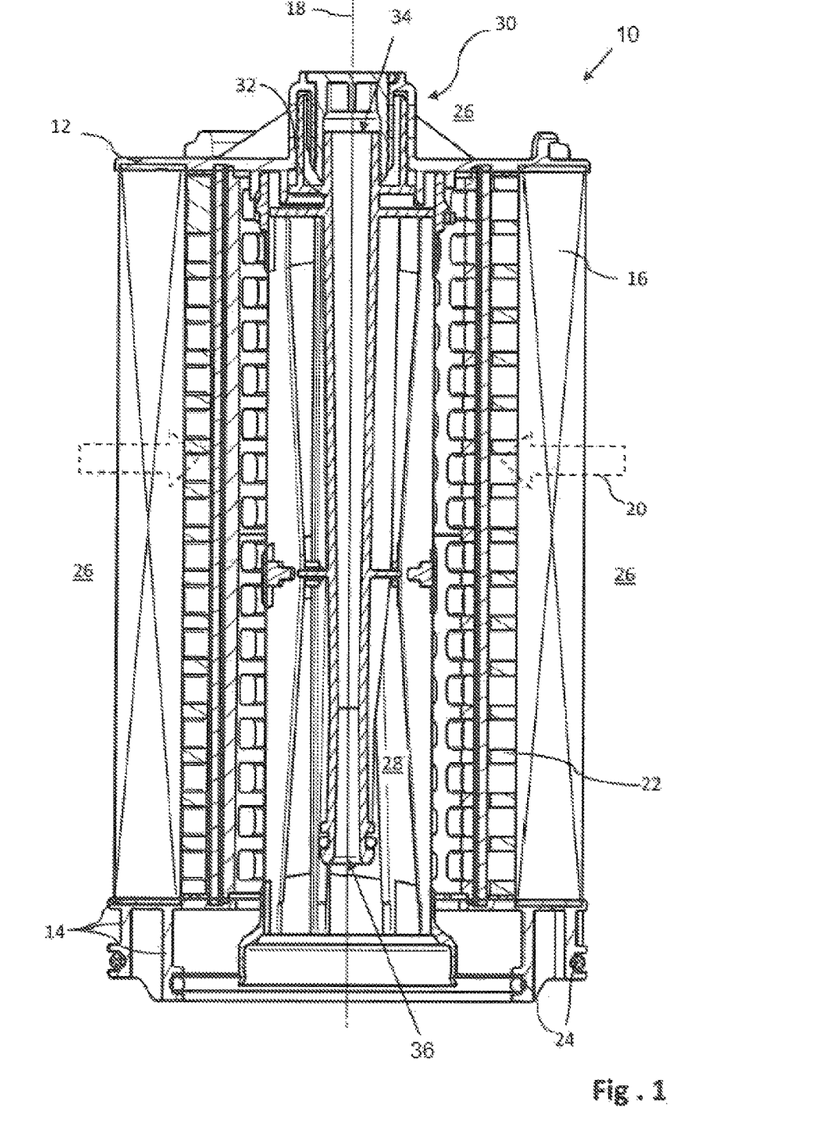
FIG. 1 shows, in longitudinal section, a filter element comprising an upper and a lower end plate, between which a filter medium is arranged, and two vent channels for a post-filtration side and a pre-filtration side of the filter element which are configured spirally and are connected by means of a common siphon to a vent tube which is fixed to the element and arranged centrally.

FIG. 1 shows a filter element 10 for filtering out contaminants contained in a liquid medium, in this case fuel. The filter element 10 is provided as a replaceable wear part for use in a filter housing of a liquid filter which is not illustrated in greater detail. In its operating position the filter element 10 has an upper first and a lower second end plate 12, 14, between which a filter medium 16 is arranged for filtering out particulate contaminants contained in the fuel. The filter medium 16 is arranged in an annular manner relative to the central or longitudinal axis 18 of the filter element and can be configured in particular in the form of a bellows pleated in a star shape. The filter medium 16 is glued at both ends to the end plates 12, 14 or is retained, embedded, in a fluid-tight manner in the material of the end plates 12, 14. In operation, i.e. in filter operation, the liquid medium can flow from radially outside to radially inside through the filter medium in a main flow direction extending radially with respect to the longitudinal axis 18. A supporting or central tube 22 which is configured in the form of a grid, and against which the filter medium 16 bears directly or indirectly on the inside, serves for radially internal support of the filter medium 16. The lower end plate 14 has sealing elements 24, preferably elastomeric, as a sealing seat of the filter element 10 in a filter housing.

A flow region of the contaminated fuel to be filtered is arranged fluidically upstream of the filter medium 16 and forms a so-called pre-filtration side 26 of the filter element. A post-filtration side of the filter element 10 arranged fluidically downstream of the filter medium is designated by 28.

The filter element has a venting arrangement 30, which facilitates venting of the pre-filtration side 26 and also the post-filtration side 28 of the filter element 10. The venting arrangement 30 comprises a vent tube 32 fastened to the element. The vent tube 32 is therefore an integral component of the filter element 10 and, as such, forms an assembly together with this element. The vent tube 32 is arranged so that it extends coaxially with respect to the longitudinal axis 18 of the filter element 10 and is arranged partially inside the filter medium. According to FIG. 1 the vent tube 32 extends substantially from the upper end plate 12 axially in the direction of the lower end plate 14, but it can also protrude or project in the axial direction beyond the lower end plate 14. The vent tube 32 has an upper inlet opening 34 and a lower outlet opening 36, for connecting the vent tube 32 to a vent stub (not shown) of the aforementioned filter housing, which vent stub can be fluidically connected, for example, to a fuel tank of a motor vehicle. For this purpose, the vent tube 32 can be provided with a sealing element 24.

Figure 2:
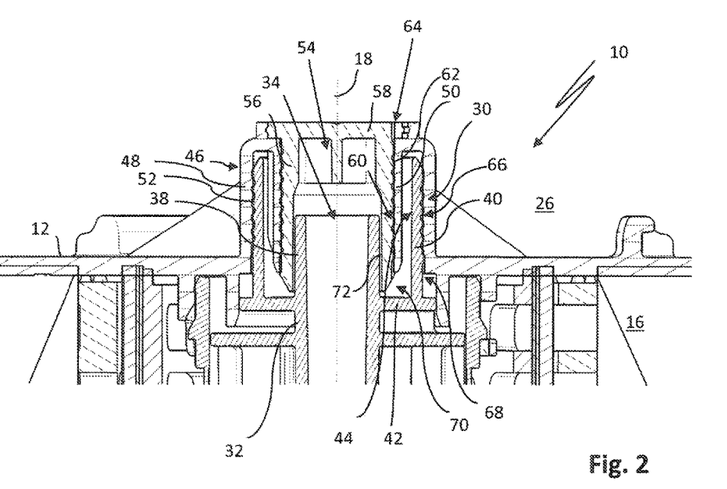
FIG. 2 shows a detail of the filter element of FIG. 1.
Figure 3:
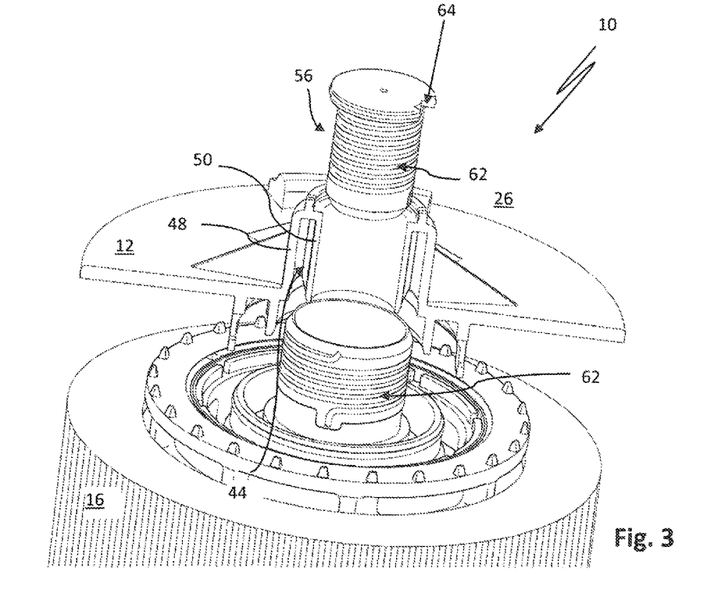
FIG. 3 shows a detail of the filter element of FIG. 1 in a partially exploded and sectional representation of the parts thereof.
Figure 4:
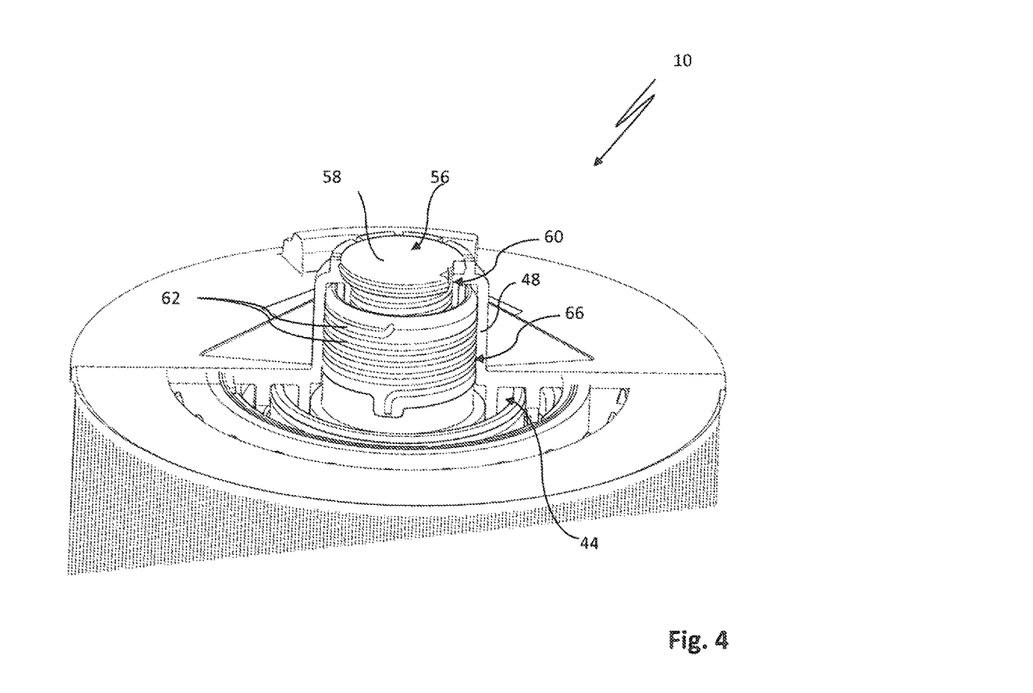
FIG. 4 shows a detail of the filter element of FIG. 1 in a partially sectional representation.

FIGS. 2 to 4 each show an enlarged detail of the filter element according to FIG. 1. The vent tube 32 has an upper end portion 38, on which a cylindrical tube stub 40 is formed by means of a connecting portion 42. The tube stub 40 surrounds the end portion 38 of the vent tube 32 and extends into a recess 44 of a double-walled stub 46 of the upper end plate 12. The stub 46 extends in the axial direction away from the upper end plate 12. The depression 44 in the upper end plate 12 is delimited in the radial direction outwards by an annular outer wall member 48 of the stub 46 or of the upper end plate 12. Internally in the radial direction the recess 44 is delimited by an annular inner wall member 50 of the stub 46 or of the upper end plate 12. The outer and the inner wall members 48, 50 are made integrally with the upper end plate 12 and are connected to one another by means of a back portion designated by 52.

The tube stub 40 of the vent tube 32 bears with its outer shell surface 52 against the outer wall member 48 of the upper end plate 12 in a radial press fit internally and as a result is permanently held on the upper end plate 12.

The upper end plate has a central opening 54. The central opening 54 is delimited by the inner wall member 50 of the stub 46 of the upper end plate 12. An insert part 56 formed as a closure sleeve is held inside the central opening 54. The insert part 56 is closed at one end by a base portion 58. The insert part 56 is supported axially by its base portion 58 on the stub 46 of the upper end plate 12 and is kept latched circumferentially on the stub 46. It will be understood that the insert part can also be fastened in some other way on the upper end plate. The insert part 56 extends into the filter element 10 in the axial direction and bears against the inner wall member 50 of the upper end plate 12 in the radial direction on the inside by non-positive engagement, preferably in a radial press fit.

For venting the pre-filtration side 26 of the filter element 10, the venting arrangement 30 has a first capillary vent channel 60. The first vent channel 60 comprises a groove 62 arranged externally on the insert part. The groove 62 is formed as a spiral groove and is arranged so that it extends helically with respect to the longitudinal axis 18 of the filter element 10. The spiral groove is covered or delimited externally in the radial direction by the inner wall member 50 of the upper end plate 12. The first vent channel has an inlet 64 which is formed in the base portion 58 of the insert part 56.

A second, preferably capillary vent channel 66 of the venting arrangement 30 serves for venting the post-filtration side 28 of the filter element 10. The second vent channel 66 comprises a groove 62 which is arranged externally on the tube stub 40 of the vent tube 32 and which is delimited in the radial direction by the outer wall member 48 of the upper end plate 12. The groove 62 is formed as a spiral groove in a manner corresponding to the first vent channel. The groove 62 of the second vent channel 66 has an inlet designated by 68.

The venting arrangement has a siphon 70 comprising a riser channel 72 which, when the filter element 10 is in operation, is at least partially filled with the liquid medium. The siphon 70 is arranged fluidically between the two vent channels 60, 66 and the upper inlet opening 34 of the vent tube 32. The siphon 70 is delimited in the radial direction externally by the tube stub 40 and in the radial direction internally by the upper end portion 38 of the vent tube 32. The connecting portion 42 of the vent tube 32 serves for delimitation of the siphon 70 axially downwards. The two vent channels 60, 66 each open into the axially extending (annular) riser channel 72, by means of which the siphon 70 is connected to the upper inlet opening of the vent tube 32. Because the insert part extends into the siphon, this results in an overall meandering or U-shaped flow path for the air to be drained by the siphon.

During the filter operation, the venting arrangement 30 enables permanent venting of the post-filtration side 28 of the filter element 10 and also of the pre-filtration side 26 of the filter element 10, and therefore of the filter housing (not shown). Even in the absence of a throughflow of the liquid medium through the filter element 10, for instance after the shutdown of an internal combustion engine operated by the fuel, the siphon 70, in particular the riser channel 72, and also optionally the capillary vent channels, remain filled with fluid. In this way an undesirable backflow of air from the vent tube 32 onto the post-filtration side 28 and also the pre-filtration side 26 of the filter element 10 can be reliably counteracted. Penetration of air from the pre-filtration side 26 of the filter element 10 onto the post-filtration side 28 thereof can also be counteracted by the siphon 70. Consequently, when the filter operation is resumed, i.e. when the internal combustion engine is started, a predetermined operating pressure of the liquid medium or of the fuel on the post-filtration side 28 of the filter element 10 can be built up quickly. This is advantageous in particular when the filter element 10 is used in vehicles which are used in inner-city or regional distribution transport and which have a so-called automatic start-stop.

In FIG. 3 the filter element 10 is illustrated as a detail in a partially exploded representation. The capillary grooves 62 of the tube stub 40 of the vent tube and also of the insert part can be clearly seen. The vent tube 32, the insert part 56 and also the upper end plate 12 of the filter element 10 can each be formed as injection moldings.

Figure 5:
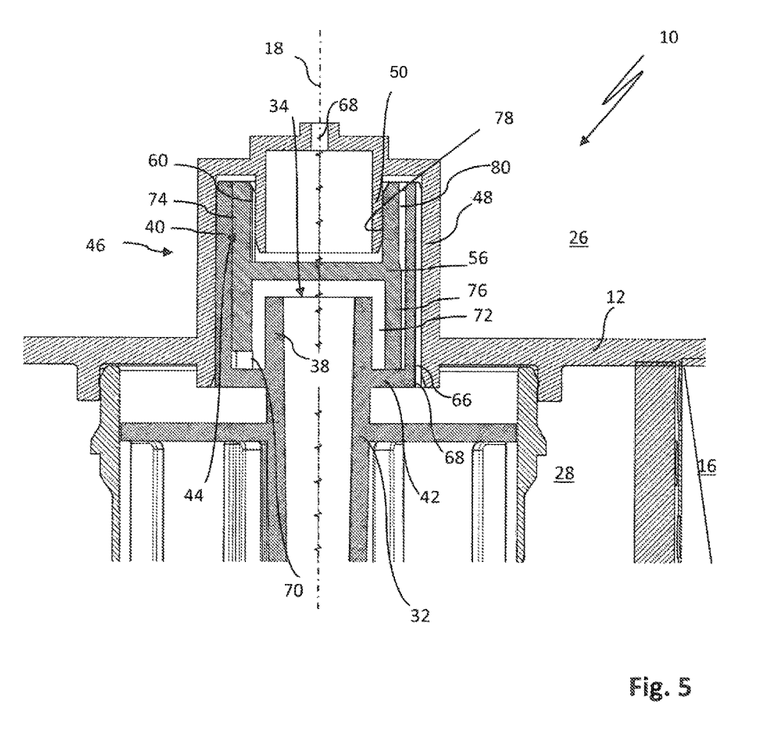
FIG. 5 shows a further filter element, wherein the vent channels are in each case configured as axial channels extending in a straight line, in a longitudinal sectional detail.
Figure 6:
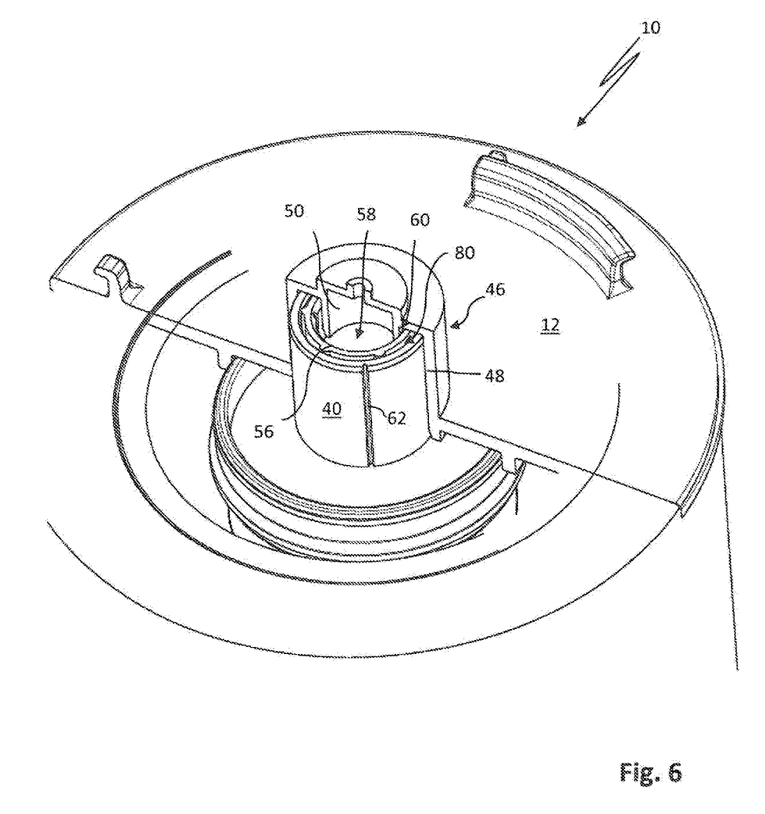
FIG. 6 shows the filter element of FIG. 4 in a partially exploded and sectional representation of the parts thereof.
Figure 7:
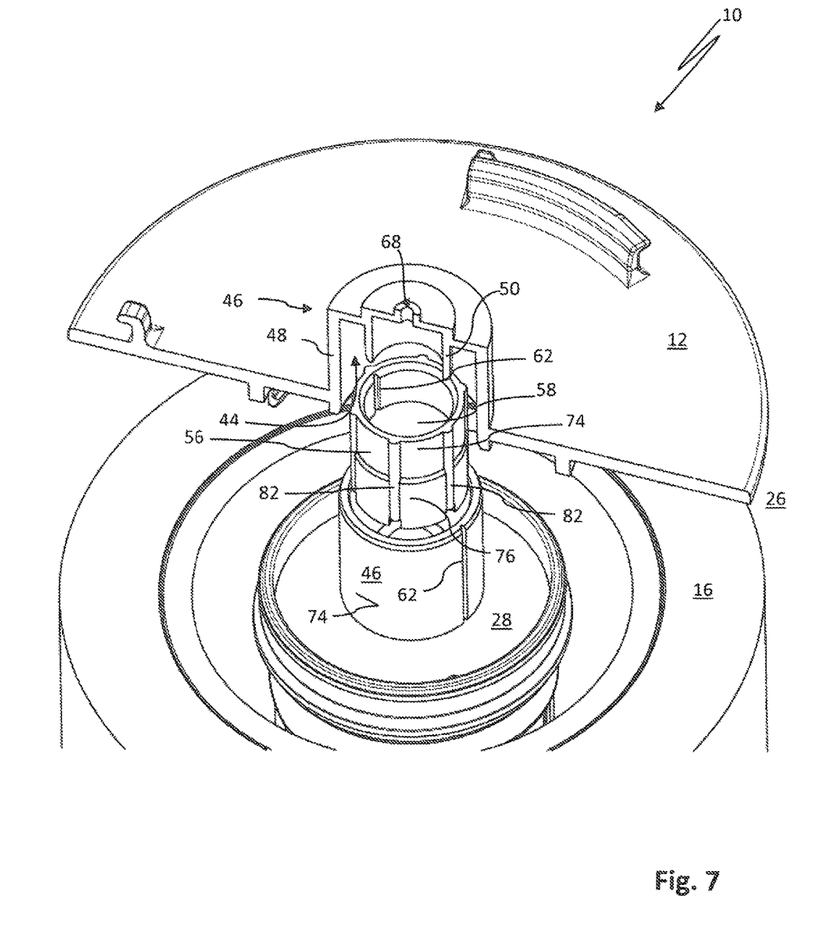
FIG. 7 shows the filter element of FIG. 4 in a partially sectional representation.

FIGS. 5 to 7 show a further filter element 10. The filter element 10 differs from the filter element explained above in connection with FIGS. 1 to 4 primarily in that the insert part 56 is formed as a double sleeve formed with an H-shaped longitudinal sectional profile. The insert part has a base portion 58 comprising a first (upper) and a second (lower) sleeve portion 74, 76. The first sleeve portion 74 extends axially from the base portion 58 into the recess 44 in the upper end plate 12 and bears with its inner face 78 against the inner wall member 50 of the upper end plate 12 in positive engagement, and also preferably in a radial press fit. The first vent channel 60 comprises a linear and axially extending groove 62 which is arranged internally on the first sleeve portion 74 and is delimited in the radial direction by the first sleeve portion 74 of the insert part 56 and the inner wall member 50 thereof. The second sleeve portion 76 extends in the axial direction into the siphon 70. The second vent channel 66 is formed between the tube stub 40 of the vent tube 32 and the outer wall member 48 of the upper end plate 12.

The two vent channels 60, 66 open into a common and substantially annular collecting channel 80, which is formed in the radial direction between the tube stub 40 and the insert part 56. The collecting channel 80, with the riser channel 72 and the horizontally oriented region between them, forms the siphon 70. The riser channel 72 of the siphon 70 is fluidically connected to the upper inlet opening 34 of the vent tube 32. The first vent channel 60 is fluidically connected by means of an inlet 64 formed as a through bore in the upper end plate 12 to the pre-filtration side (=outer side) 26 of the filter element 10. The linear axial configuration of the two vent channels 60, 66 can be clearly seen in the partially sectional perspective view of a detail of the filter element 10 in FIG. 6 or the partially exploded view of the parts of the filter element in FIG. 7. In the circumferential direction of the filter element 10 the common collecting channel 80 of the two capillary vent channels 60, 66 is interrupted by rib-like spacers 82 of the insert part 56 which extend away from the insert part 56 in the radial direction. According to FIG. 7 the rib-like spacers 82 extend in the axial direction over the entire length of the insert part 56. Since fluid can likewise remain in the vent channel 60 and the interior space delimited by the inner wall member 50, a siphon (on the post-filtration side) is also formed at this point.

What is claimed is:

1. A filter element (10) for a liquid medium, comprising:
   a filter medium (16) arranged as an annular filter medium which surrounds a longitudinal axis (18) of the filter element, the longitudinal axis extending through an interior of the annular filter medium,
   an upper end plate (12) secured onto an upper axial end of the annular filter medium, having:
      a double walled stub (46) formed on the upper end plate and projecting axially outwardly away from the filter medium, the double walled stub (46) having:
         an annular outer wall member (48); and
         an annular inner wall member (50) spaced apart radially inward from the annular outer wall member (48); and
   a lower end plate (14) secured onto a lower axial end of the annular filter medium;
   wherein the filter element (10) has:
      a pre-filtration side (26) arranged at a radially outer side of the annular filter medium (16), the pre-filtration side (26) arranged fluidically upstream of the annular filter medium (16); and
      a post-filtration side (28) arranged at radially interior side of the annular filter medium (16), the post-filtration side (28) arranged fluidically downstream of the filter medium (16); and
   a venting arrangement (30) arranged on the upper end plate (12) and venting both the pre-filtration side and the post-filtration side (26, 28) of the filter element (10) through the upper end plate (12), the venting arrangement (30) comprising:
      a first vent channel (60), which is fluidically connected at an intake end to the pre-filtration side (26) of the filter element (10);
      a second vent channel (66) having an intake end fluidically connected to the post-filtration side (28) of the filter element (10); and
      a vent tube (32) connected to the upper end plate (12) and having a portion of the vent tube (32) extending away from the upper end plate (12) in an interior of the annular filter medium in an axial direction towards the lower end plate (14);
         wherein the vent tube (32) has a first axial end having an inlet opening (34) and an outlet opening (36) at an opposite second axial end of the vent tube;
         wherein the vent tube has formed thereon a cylindrical tube stub (40) radially surrounding the first axial end of the vent tube (32) and the inlet opening (34), the cylindrical tube stub (40) received into an annular recess (44) of the double walled stub (46), formed by an annular space separating the annular outer wall member (48) and the annular inner wall member (50);
      wherein the first and second vent channels (60, 66) are in each case fluidically connected at a discharge end to the inlet opening (34) of the vent tube (32);
      wherein the venting arrangement (30) has a siphon (70) formed in an interior of the double walled stub (46) into which the first and the second vent channels (60, 66) open and are fluidically connected to the inlet opening (34) of the vent tube (32) and which is delimited at least in part by the vent tube (32).

2. The filter element according to claim 1, wherein the siphon (70) is delimited in the radial direction internally by an end portion (38) at the first axial end of the vent tube (32) and in the radial direction externally by the cylindrical tube stub (40) formed on the vent tube (32).

3. The filter element according to claim 1, wherein the siphon (70) is delimited in the axial direction by a connecting portion (42) of the vent tube (42), the connecting portion (42) connecting the vent tube (32) to the cylindrical tube stub (40) surrounding the first axial end of the vent tube (32).

4. The filter element according to claim 1, wherein the vent tube (32) retained on the inlet opening side in the annular recess (44) in the upper end plate (12) in a radial press fit into the annular recess (44), wherein the annular recess (44) is delimited in the radial direction externally by the outer wall member (48) and in the radial direction internally by the inner wall member (50) of the double walled stub (46) of the upper end plate (12), and wherein the two wall members (48, 50) extend in a direction of the longitudinal axis (18) of the filter element (10) and are formed in one piece with the upper end plate (12).

5. The filter element according to claim 4, wherein the vent tube (32) is retained by its cylindrical tube stub (40) in the annular recess (44) of the double walled stub (46) in the upper end plate (12).

6. The filter element according to claim 1, wherein the siphon (70) is fluidically connected by means of an axially extending riser channel (80) to the inlet opening (34) of the vent tube (32), which is formed between the vent tube (32) and an insert part (56) of the upper end plate (12), the insert part (56) arranged between the vent tube (32) and the cylindrical tube stub (40).

7. The filter element according to claim 6, wherein
the first vent channel (60) is delimited in the radial direction between the annular inner wall member (50) of the upper end plate (12) and a radially outer side of the insert part (56) of the upper end plate (12).

8. The filter element according to claim 7, wherein
the first vent channel (60) comprises a spiral groove, which is open in the radial direction, formed into the inner wall member (50) or the insert part (56) of the upper end plate (12).

9. A filter element for a liquid medium, comprising:
a filter medium (16) arranged as an annular filter medium which surrounds a longitudinal axis (18) of the filter element, the longitudinal axis extending through an interior of the annular filter medium;
an upper end plate (12) secured onto an upper axial end of the annular filter medium, having:
 a double walled stub (46) formed on the upper end plate and projecting axially outwardly away from the filter medium, the double walled stub (46) having:
  an annular outer wall member (48); and
  an annular inner wall member (50) spaced apart radially inward from the annular outer wall member (48); and
a lower end plate (14) secured onto a lower axial end of the annular filter medium;
wherein the filter element (10) has:
 a pre-filtration side (26) arranged at a radially outer side of the annular filter medium (16) and fluidically upstream of the annular filter medium (16); and
 a post-filtration side (28) arranged at radially interior side of the annular filter medium (16), the post-filtration side (28) arranged fluidically downstream of the filter medium (16); and
a venting arrangement (30) arranged on the upper end plate (12) and venting both the pre-filtration side and the post-filtration side (26, 28) of the filter element (10) through the upper end plate (12), the venting arrangement (30) comprising:
 a first vent channel (60), which is fluidically connected at an intake end to the pre-filtration side (26) of the filter element (10);
 a second vent channel (66) having an intake end fluidically connected to the post-filtration side (28) of the filter element (10); and
 a vent tube (32) connected to the upper end plate (12) and having a portion of the vent tube (32) extending away from the upper end plate (12) in an interior of the annular filter medium in an axial direction towards the lower end plate (14);
  wherein the vent tube (32) has a first axial end having an inlet opening (34) and an outlet opening (36) at an opposite second axial end of the vent tube;
  wherein the vent tube has formed thereon a cylindrical tube stub (40) spaced radially outward from and radially surrounding the first axial end of the vent tube (32) and the inlet opening (34), the cylindrical tube stub (40) received into an annular recess (44) of the double walled stub (46), formed by an annular space separating the annular outer wall member (48) and the annular inner wall member (50);
  wherein the vent tube has a connecting portion (42) formed as a radially projecting wall, the connecting portion (42) connecting the vent tube (32) to the cylindrical tube stub (40);
 wherein the venting arrangement (30) has a siphon (70) formed in an interior of the double walled stub (46), the siphon (70) arranged at and delimited in the axial direction by the connecting portion (42) of the vent tube (42), the siphon (70) fluidically connected by an axially extending riser channel (72) or collecting channel (80) to the inlet opening (34) of the vent tube (32), the axially extending riser channel (72) or collecting channel (80) formed radially between the vent tube (32) and an insert part (56);
 wherein the insert part (56) extends through a central opening (54) in the upper end plate (12) in the axial direction into the filter element (10), the central opening (54) is delimited in the radial direction by the inner wall member (50) of the upper end plate (12), or in that the insert part (56) is configured as a double sleeve (74,76) which is H-shaped in longitudinal section and extends in the axial direction into the annular recess (44) in the upper end plate (12).

10. The filter element according claim 4, wherein the second vent channel (66) is delimited at least in part in the radial direction by the outer wall member (48) of the upper end plate (12) and the vent tube (32).

11. The filter element according to claim 10, wherein
the second vent channel (66) comprises a spiral groove (62) which is open in the radial direction, the spiral groove (62) formed into the outer wall member (48) of the upper end plate (12) or formed on the vent tube (32).

12. The filter element according to claim 9, wherein
the second vent channel (66) opens into the siphon (70).

13. The filter element according to claim 3, wherein
the first and/or the second vent channel (60, 66) is configured as a spiral groove which extends helically around the longitudinal axis (18) of the filter element (10).

14. A filter system comprising a filter housing to accommodate a filter element and a filter element according to claim 1.

15. The filter system according to claim 14, wherein
the filter housing has a housing vent tube which extends in the axial direction into an accommodating space for the filter element and can be connected to the second axial end of the vent tube of the filter element.

* * * * *